May 9, 1939.　　　　A. L. STEINKAMP　　　　2,157,776
VARIABLE GEAR
Filed July 6, 1937　　　2 Sheets-Sheet 1
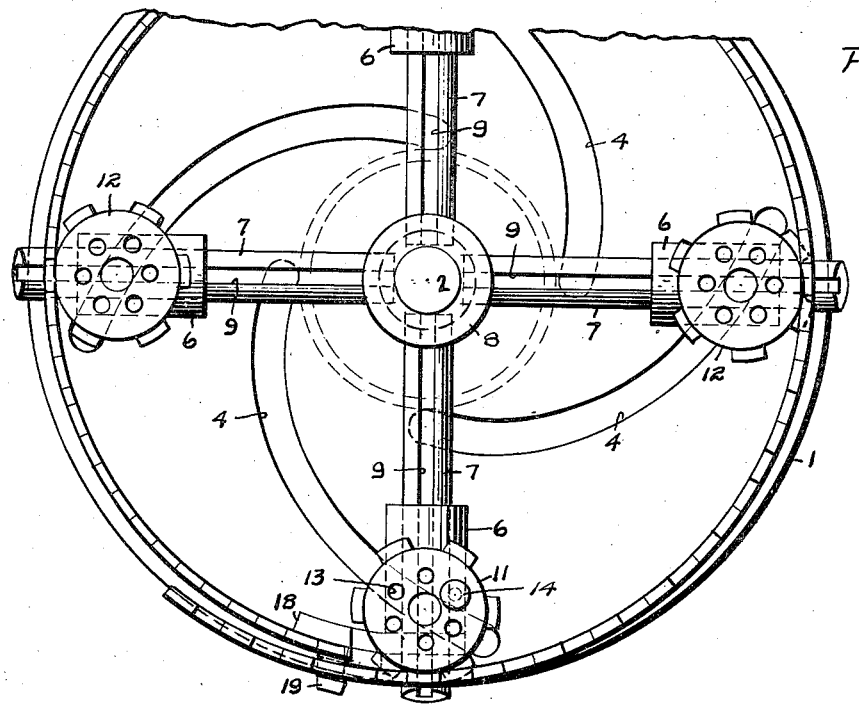
Fig. 1.
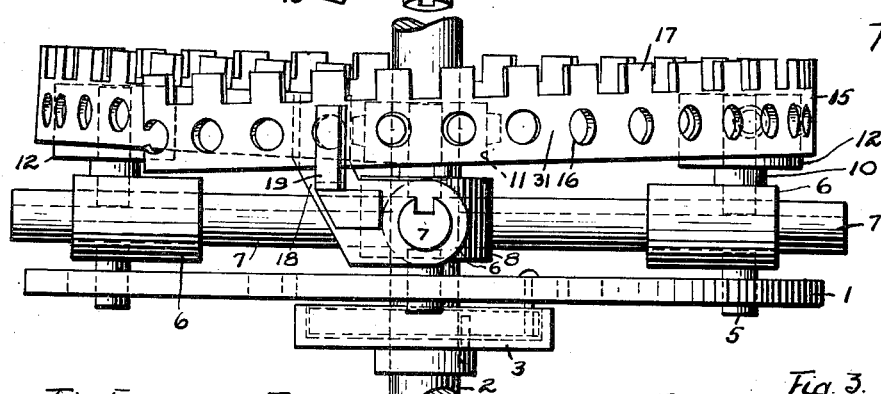
Fig. 2.
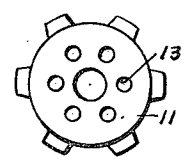
Fig. 5.
Fig. 6.
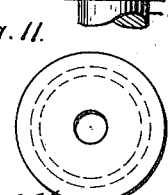
Fig. 11.
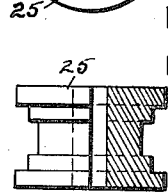
Fig. 12.
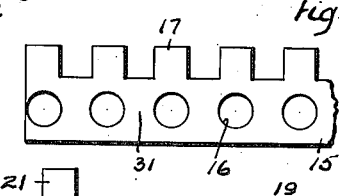
Fig. 3.
Fig. 9.
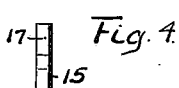
Fig. 4.
Fig. 10.
INVENTOR.
A. L. Steinkamp
BY
Elwin M. White
ATTORNEY.

May 9, 1939.  A. L. STEINKAMP  2,157,776
VARIABLE GEAR
Filed July 6, 1937  2 Sheets-Sheet 2
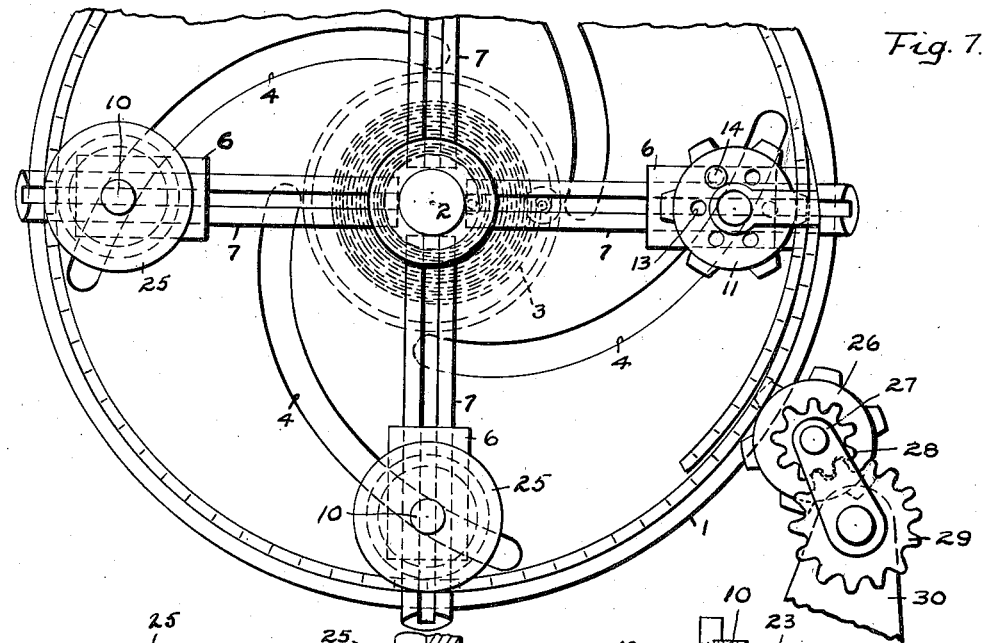
Fig. 7.
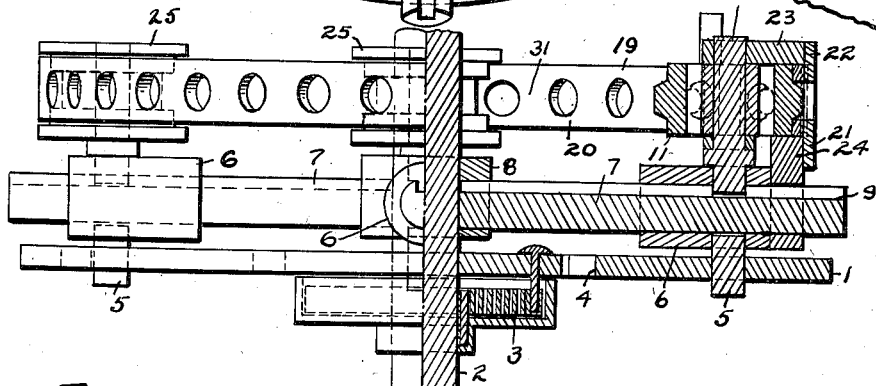
Fig. 8.
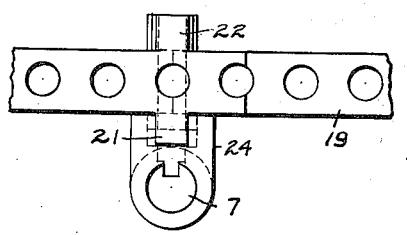
Fig. 13.
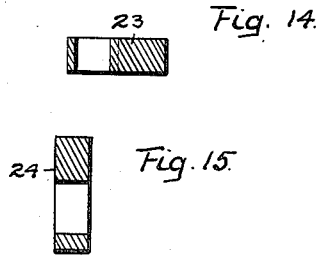
Fig. 14.
Fig. 15.
INVENTOR.
A. L. Steinkamp
BY
Elwin W. Hulse
ATTORNEY.

Patented May 9, 1939

R E I S S U E D

AUG 13 1940

2,157,776

UNITED STATES PATENT OFFICE 2,157,776

VARIABLE GEAR

Albert Louis Steinkamp, Fort Wayne, Ind.

Application July 6, 1937, Serial No. 152,046

6 Claims. (Cl. 74—449)

The invention relates to variable gears and its object is to provide a gear in which means are provided for changing the number of teeth thereon at will.

A further object is to provide a gear with means by which the shape of the gear may be changed so that the peripheral speed of the gear at its point of contact with the pinion or other connecting part may be varied during each revolution whether the gear shaft is rotated at a constant or varying speed.

Another object is to provide a variable gear with means by which a constant peripheral speed at its point of contact with the connecting rotatable part may be obtained when the gear shaft is rotated at a constant speed.

Another object is to provide a variable gear with means by which a constant peripheral speed, at its point of contact with the connecting rotatable part, may be obtained when the gear shaft is rotated at a varying speed.

The invention consists primarily of a flexible member carrying teeth adapted to be adjusted peripherally to vary the number of operating or active teeth thereon and means to retain the carrier in any adjusted peripheral position and form.

The invention is illustrated in the accompanying drawings, in which

Figure 1 is a plan view, partly broken away, of a device embodying the invention.

Fig. 2 is an elevation of the device.

Fig. 3 is a fractional view of the flexible band or carrier.

Fig. 4 is an end view of said band.

Fig. 5 is a plan view of the holding member for the band.

Fig. 6 is an elevation of the holding member partly in section.

Fig. 7 is a plan view, broken away, of the device having a modified form of the band and holding means.

Fig. 8 is an elevation partly in section of said modified form.

Fig. 9 is a view of a fraction of the modified band and

Fig. 10 is an end view of the same.

Fig. 11 is a plan view of the holding member used with the modified form of the band and Fig. 12 is an elevation partly in section of the same.

Fig. 13 is an elevation of the holding means and band taken at X, Fig. 7.

Fig. 14 is a sectional view of the upper anchoring member for the modified band and Fig. 15 is a sectional view of the lower anchoring member for said band.

Referring to the illustrative embodiment of the invention, 1 is a disk revolubly mounted on the shaft 2. A spring 3 tends to rotate the disk clockwise. A series of cam slots 4 is formed in the disk and each slot receives a pin 5 that projects from a tubular member or sleeve 6 slidably mounted on a shaft or spoke 7 which projects radially from a hub 8 that is rigidly mounted on the shaft 2. A key way 9 is formed in each shaft 7 and receives a pin 10 that is secured to the sleeve 6 and prevents the rotation of the sleeve 6 on the shaft.

Toothed holding members 11, 12 are revolubly mounted on the upper ends of the pins 10 respectively, each member having a series of openings 13 therein, in any one of which a pin 14 may be inserted, which will so engage the sleeve 6 below it as to lock the member to the sleeve. Each member 11, 12 may be locked to its supporting sleeve, or one or more of them may be similarly locked as desired.

A flexible band 15, having its ends overlapping, has a series of properly spaced openings or recesses 16 or teeth 31 formed thereon, and a series of properly spaced teeth 17 projects from the band. The openings 16 or teeth 31 engage with one or more teeth on each member 11, 12. A driving or driven pinion (not shown) will mesh with the teeth 17.

The overlapping ends of the band 15 are preferably located adjacent to one of the holding members, as member 11, and they are prevented from radial separation by two flanges 18 and 19 which are mounted on the sleeve 6, between which flanges the overlapping ends of the band extend. The inner end of the band is fixed to the flange 18. By pinning the member 11 to the sleeve 6 below it, the member 11 is fixed so that the band will not expand and the overlapping teeth on the band are held in alignment for a given setting.

The area enclosed by the band may be changed in various ways, two of which are shown.

One method is to release all of the locking pins 14. The member 11 at the point where the ends of band 15 overlap, is then rotated in the proper direction to increase or decrease the number of active teeth on the band. All of the members 11, 12 are moved in or out radially, simultaneously due to the spring 3 acting through the disc 1, the cams 4, and the pins 5, thereby maintaining the same radial pressure against the band 15 at the points of contact with the holding members. The pins 14 are then returned to locking position.

In the modified form illustrated in Figs. 7 and 8, the band 19 carries no teeth on its edges, but has the openings or recesses 20 or teeth 31 formed thereon. Adjacent one end of the band 19 are two projections 21, 22 at opposite edges of the band. The ends of the band overlap with the end carrying the projections 21 and 22 being outermost. The projections 21 and 22 are secured to members 24 and 23 respectively, which are in turn secured to the sleeve 6 and to the top end of pin 10, respectively. The upper member 23 is above the holding member 11 and the lower member 24 is below the holding member 11. The band is thus attached at one end to one of the sleeves 6, the other end preferably underlapping the fixed end. The toothed member 11 engages the openings or recesses in the underlapping end of band 19. The teeth of member 11 engage the underlapping end of band 19 only. The pulleys 25 mounted on the pins 10 of the remaining sleeves 6 respectively are engaged by the band and prevent the band from moving axially along the shaft 2.

In the modification, a toothed member 26 engages the band 19 and is revolubly mounted on a bracket or support 27. A pinion 28, rigidly mounted on the shaft of the member 26, meshes with a gear 29 mounted on the arm 30. Suitable tension means, not shown, will be applied to the members 27, 30 so that the member 26 will at all times engage the band irrespective of the shape or size thereof. Power will be taken from or applied to the gear 29.

What I claim is:

1. A variable gear comprising a flexible gear-engaging member having its opposite ends overlapped, a shaft, and radially adjustable members supported on the shaft and having toothed engagement with the flexible member for holding the flexible member in any position relatively to the shaft.

2. A variable gear comprising a flexible gear-engaging member having its opposite ends overlapped, a shaft, members radiating from the shaft and means slidably mounted on the members and having toothed engagement with the band for holding the band in any adjusted position relatively to the shaft.

3. A variable gear comprising a shaft, a series of members radiating from the shaft, a sliding member on each radiating member, a cam carrier revolubly mounted on the shaft, the sliding members having engagement with the cams respectively, tooth-carrying members mounted on the slidable members and a flexible band having tooth-engaging means thereon engaging the tooth-carrying members.

4. A variable gear comprising a shaft, a series of members radiating from the shaft, a sliding member on each radiating member, a cam carrier revolubly mounted on the shaft, the sliding members having engagement with the cams respectively, tooth-carrying members mounted on the slidable members, a flexible band having tooth-engaging means thereon engaging the tooth-carrying members and resilient means tending to hold the tooth-carrying members in engagement with the band.

5. A variable gear comprising a shaft, a series of members radiating from the shaft, a sliding member on each radiating member, tooth-carrying members mounted on the slidable members and a flexible band having tooth-engaging means thereon engaging the tooth-carrying members.

6. A variable gear comprising a shaft, a series of members radiating from the shaft, a sliding member on each radiating member, tooth-carrying members mounted on the slidable members, a flexible band adapted to engage the tooth-carrying members and having its opposite ends overlapped and cooperating means on one of the slidable members and on the band for preventing radial separation of the overlapped ends of the band.

ALBERT LOUIS STEINKAMP.